Feb. 22, 1966  K. R. PITCHER  3,236,224
AIR PISTOL
Original Filed July 28, 1961  7 Sheets-Sheet 1
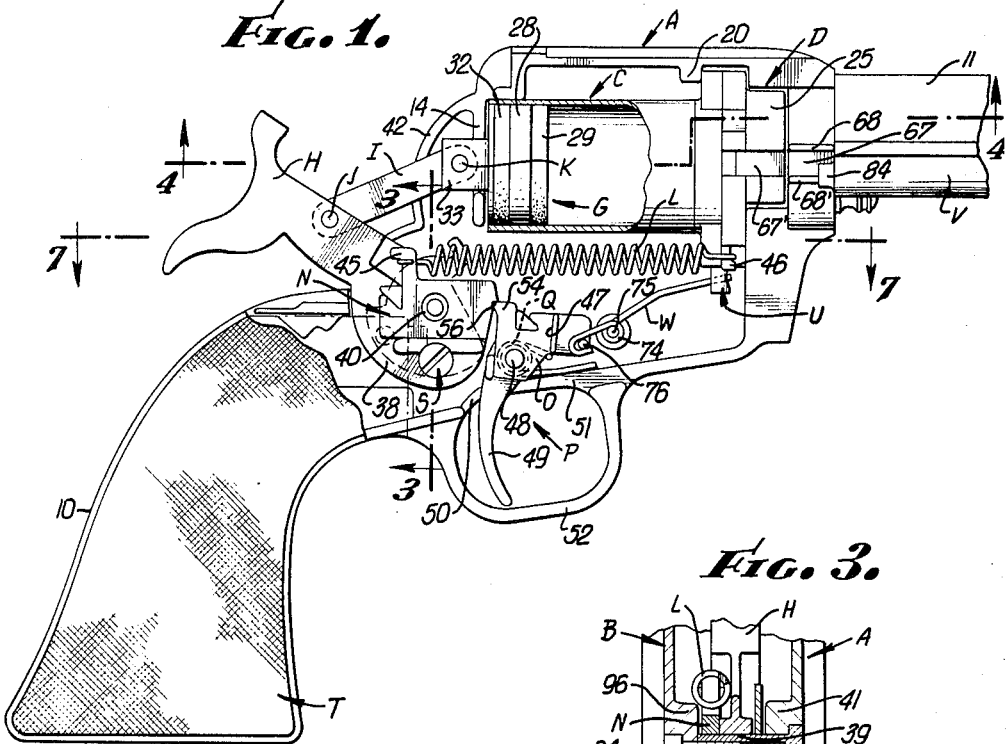
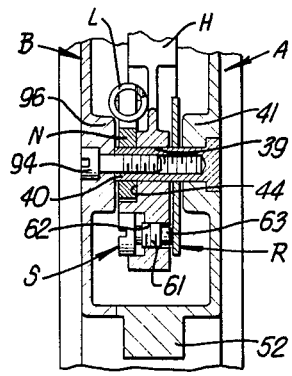
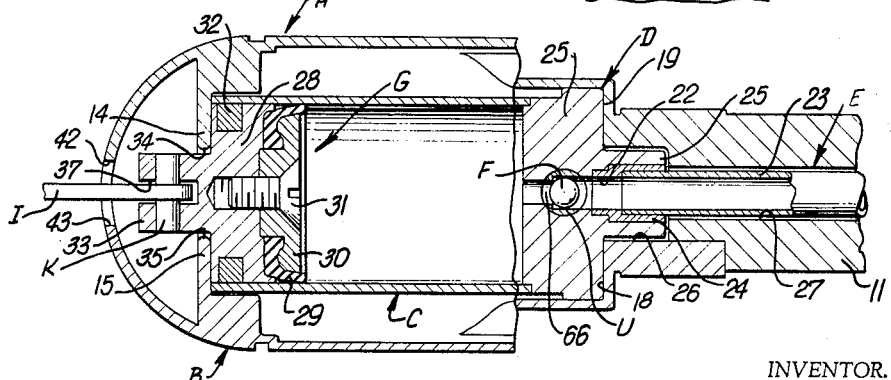
INVENTOR.
*Kenneth R. Pitcher*
BY
*Attorneys.*

Feb. 22, 1966 K. R. PITCHER 3,236,224
AIR PISTOL
Original Filed July 28, 1961
7 Sheets-Sheet 2

Kenneth R. Pitcher
INVENTOR.
BY
ATTORNEYS.

Feb. 22, 1966   K. R. PITCHER   3,236,224
AIR PISTOL
Original Filed July 28, 1961   7 Sheets-Sheet 3
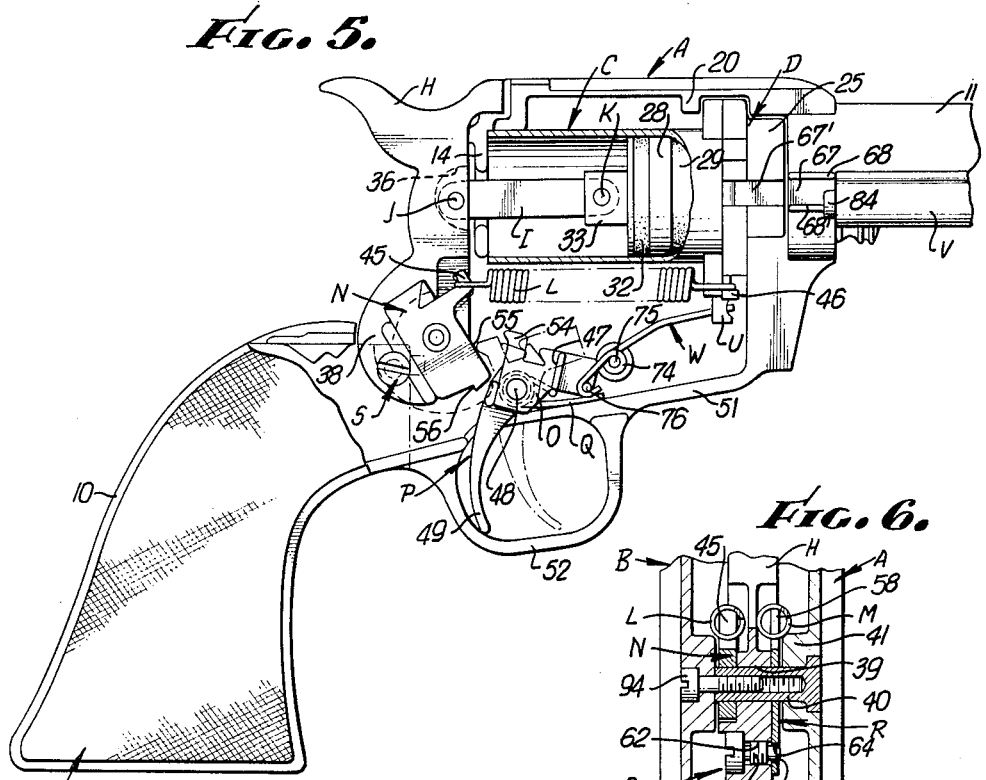
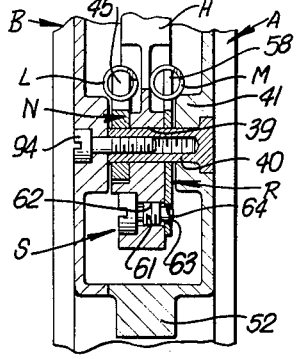
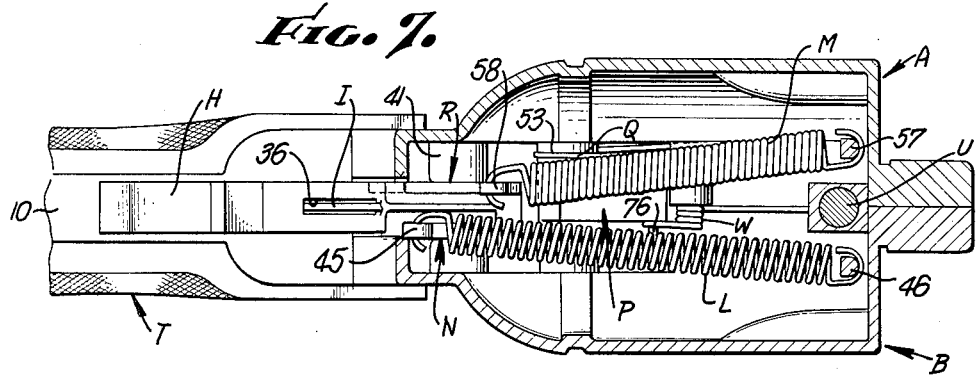
INVENTOR.
KENNETH R. PITCHER
BY
ATTORNEYS.

Feb. 22, 1966  K. R. PITCHER  3,236,224
AIR PISTOL
Original Filed July 28, 1961  7 Sheets-Sheet 4
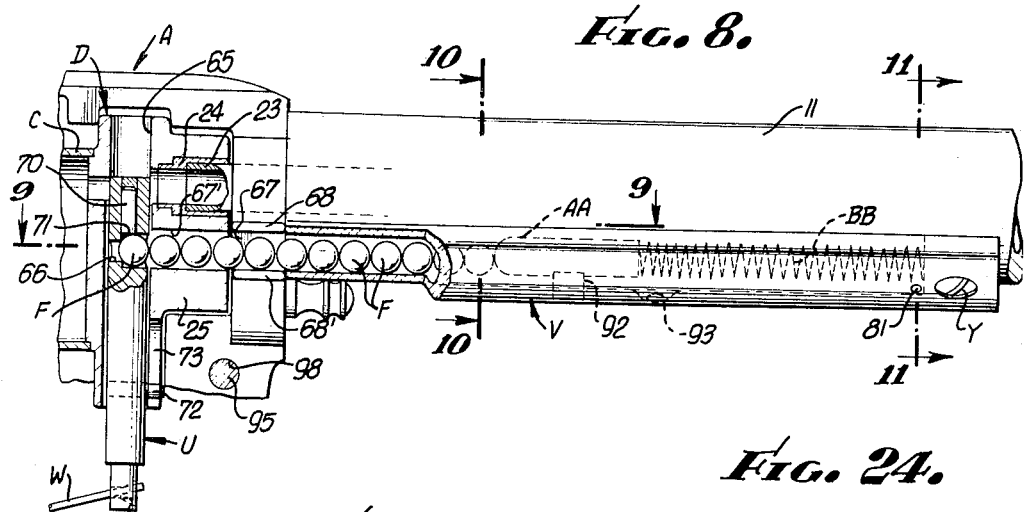
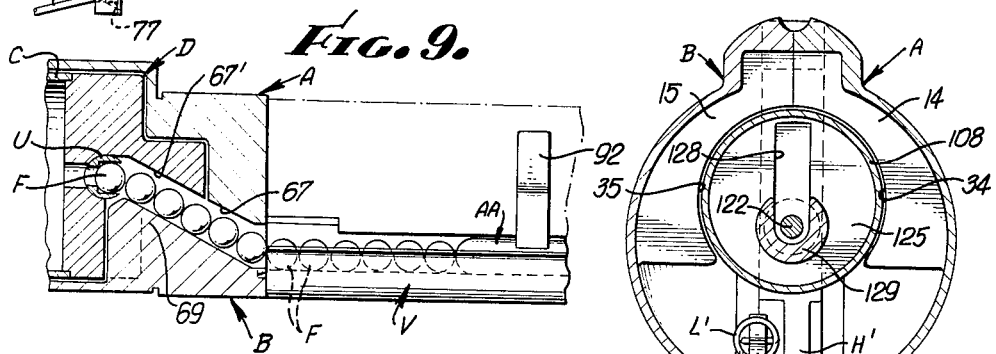
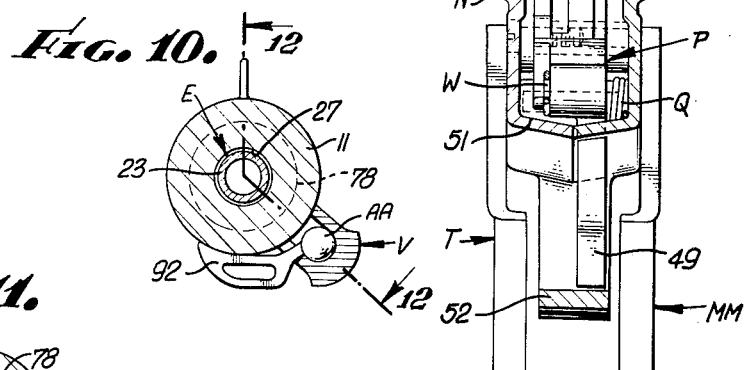
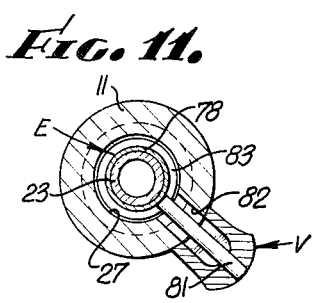
INVENTOR.
KENNETH R. PITCHER
BY
ATTORNEYS.

Feb. 22, 1966    K. R. PITCHER    3,236,224
AIR PISTOL
Original Filed July 28, 1961    7 Sheets-Sheet 5
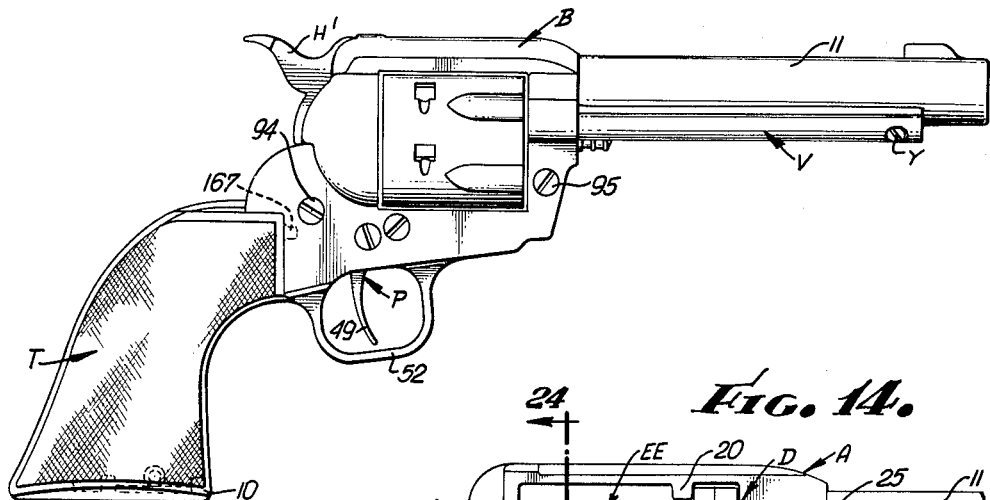
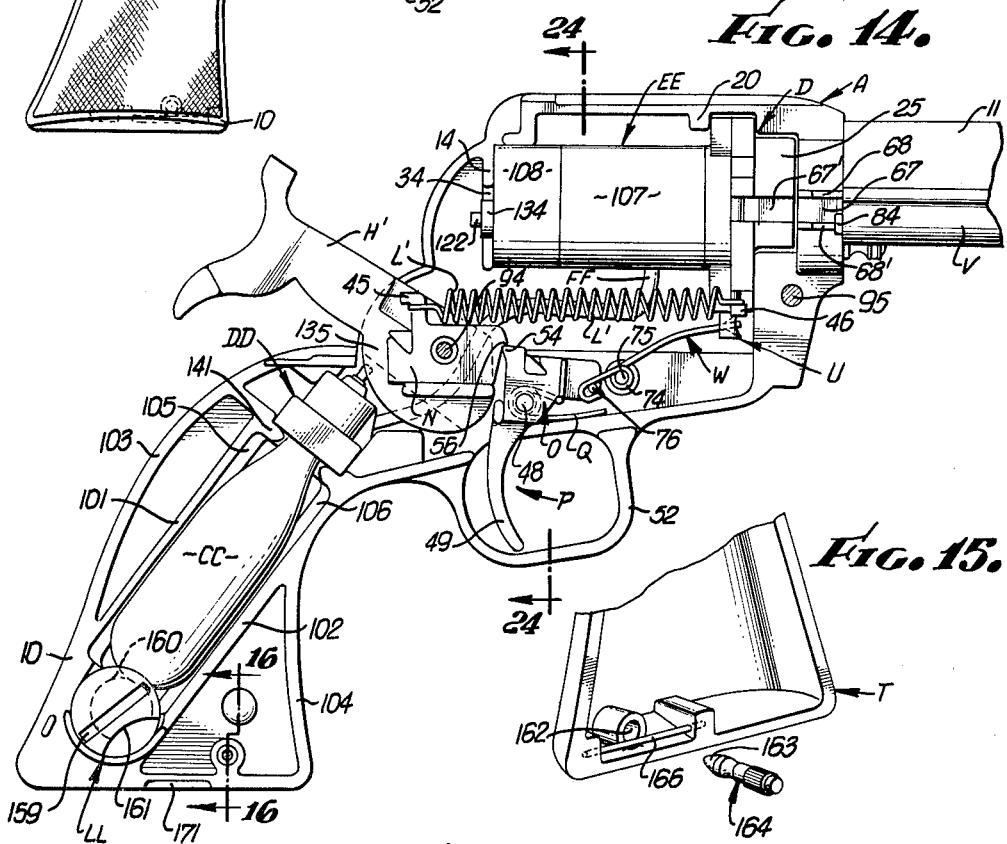
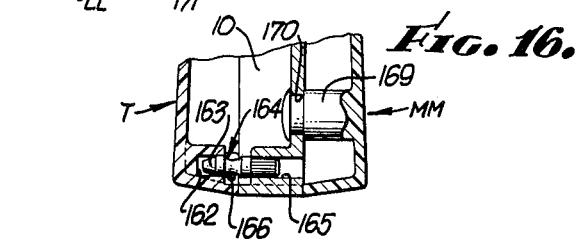
INVENTOR.
KENNETH R. PITCHER
BY
ATTORNEYS.

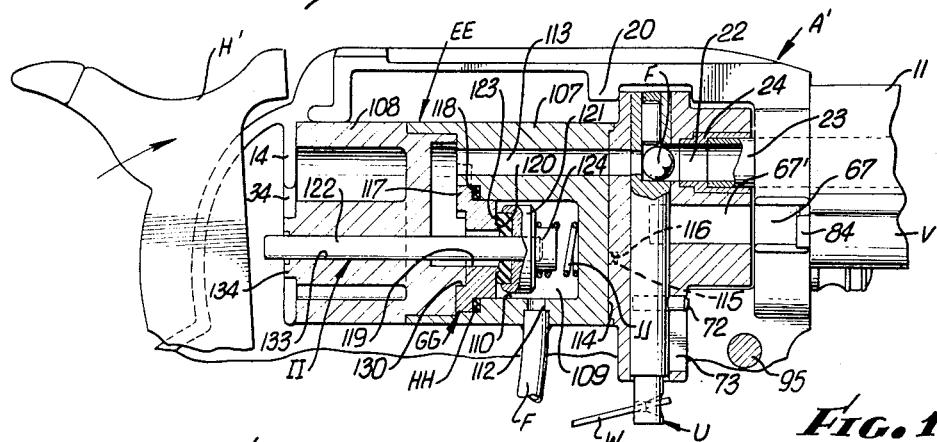
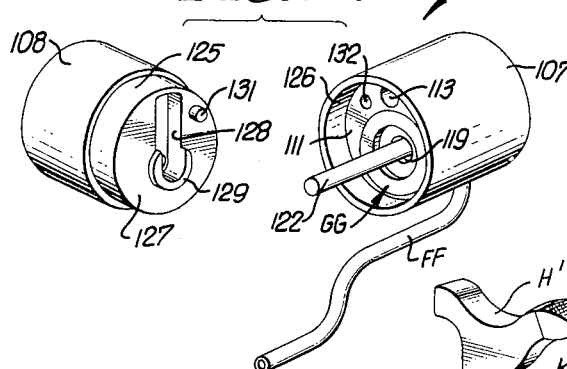
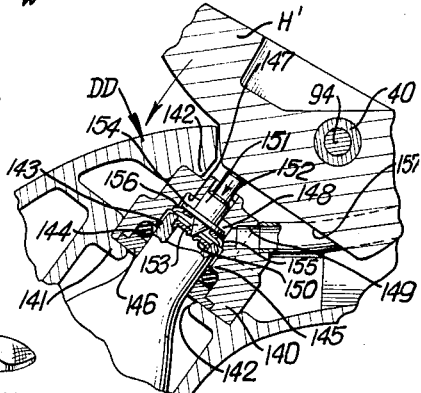
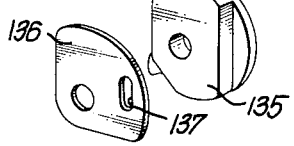
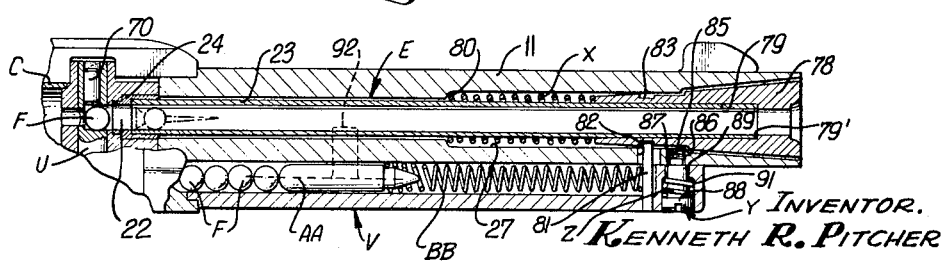

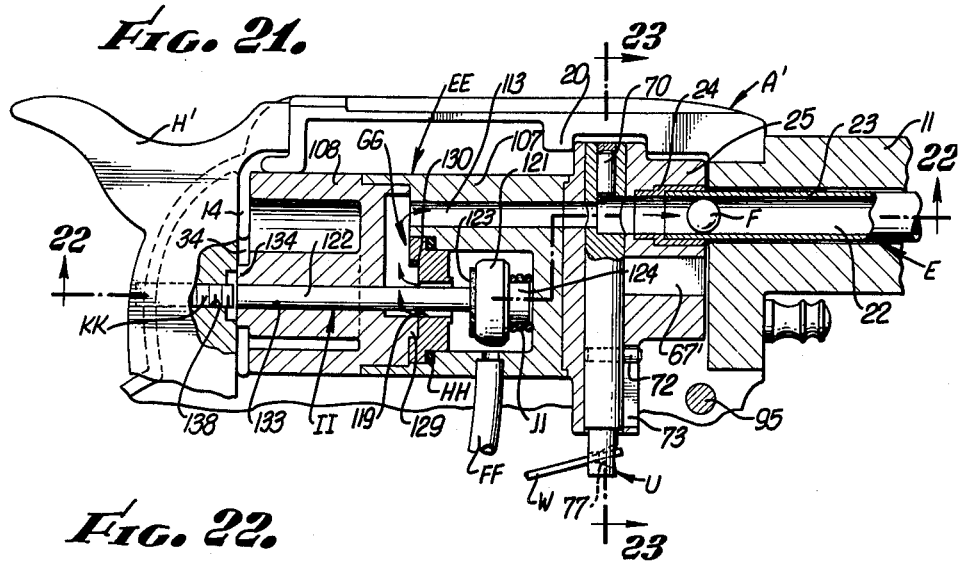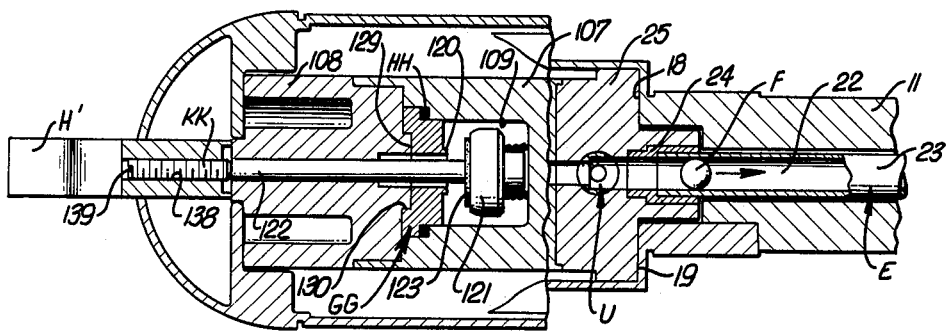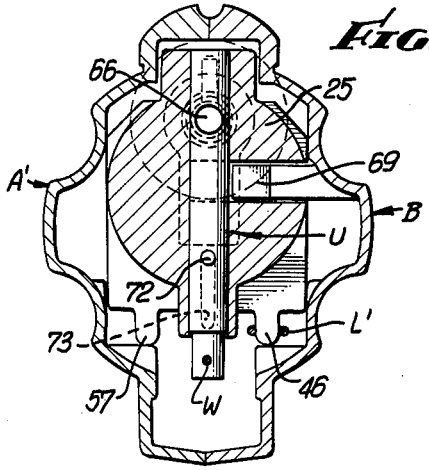

United States Patent Office 3,236,224
Patented Feb. 22, 1966

3,236,224
AIR PISTOL
Kenneth R. Pitcher, Encino, Calif., assignor to Healthways, Los Angeles, Calif., a corporation of California
Original application July 28, 1961, Ser. No. 127,672. Divided and this application Feb. 28, 1963, Ser. No. 267,070
5 Claims. (Cl. 124—53)

This invention relates to an air pistol or small arms weapon of the type in which manual retraction of the hammer automatically cocks a trigger. More particularly, this invention relates to a small arms weapon for propelling missiles such as darts or BB's.

One of the primary objects of this invention is to provide two companion pistols, one spring powered, and one powered by gas cartridge, and which have interchangeable parts for expeditious manufacture and assembly. In both instances compressed gas is the ultimate agent acting upon the missile, the spring power being used to operate a driving piston of an air cylinder.

Another object of this invention is to provide a unique air power unit for placement in a gun casting.

Another object of this invention is to provide unique apparatus for puncturing a gas cartridge so that an unpunctured unit can be punctured, the power unit charged, and the first missile projected all in a fraction of a second. This is accomplished by a unique arrangement of parts wherein manual retracting movement of the hammer is itself utilized to puncture the cartridge.

Another object of this invention is to provide a new spring power unit in which the spring power may be adjusted without exerting any force on the springs. To accomplish this purpose, a unique coupling device is provided between the hammer and the spring power unit.

Another object of this invention is to provide simplified apparatus for adjusting the power of the cartridge powered pistol.

A pistol, in order to operate properly, must be designed with reference to a specific missile size. Poorly manufeatured BB's sometimes critically exceed the standard 0.175 diameter, and the result is a damaged or jammed barrel. In order to make the pistol salvageable or reparable (as the case may be) an object of this invention is to provide a removable barrel structure. A companion object of this invention is to provide a removable barrel structure in order to make possible insertion of darts, pellets or other missiles for propulsion.

Another object of this invention is to provide an air pistol that in either gas powered or spring powered form, externally resembles a western style revolver.

This application is a division of an application of Kenneth R. Pitcher, Serial No. 127,672, filed July 28, 1961, entitled Air Pistol.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the following true-scale drawings:

FIGURE 1 is a fragmentary side elevation of a pistol incorporating the present invention, the cover being removed from the frame, portions of the apparatus being broken away and portions of the apparatus being illustrated in section;

FIG. 3 is a fragmentary sectional view, taken along a plane corresponding to line 3—3 of FIG. 1;

FIG. 4 is an enlarged fragmentary sectional view, taken along a plane corresponding to line 4—4 of FIG. 1;

FIG. 5 is a view similar to FIG. 1 but illustrating the apparatus immediately after firing;

FIG. 6 is a fragmentary sectional view similar to FIG. 3 but illustrating the manner in which the power of the pistol is augmented;

FIG. 7 is an enlarged fragmentary sectional view, taken along a plane corresponding to line 7—7 of FIG. 1;

FIG. 8 is an enlarged fragmentary elevation illustrating the barrel, magazine and firing head, a portion of the apparatus being broken away and illustrated in section;

Figure 2:
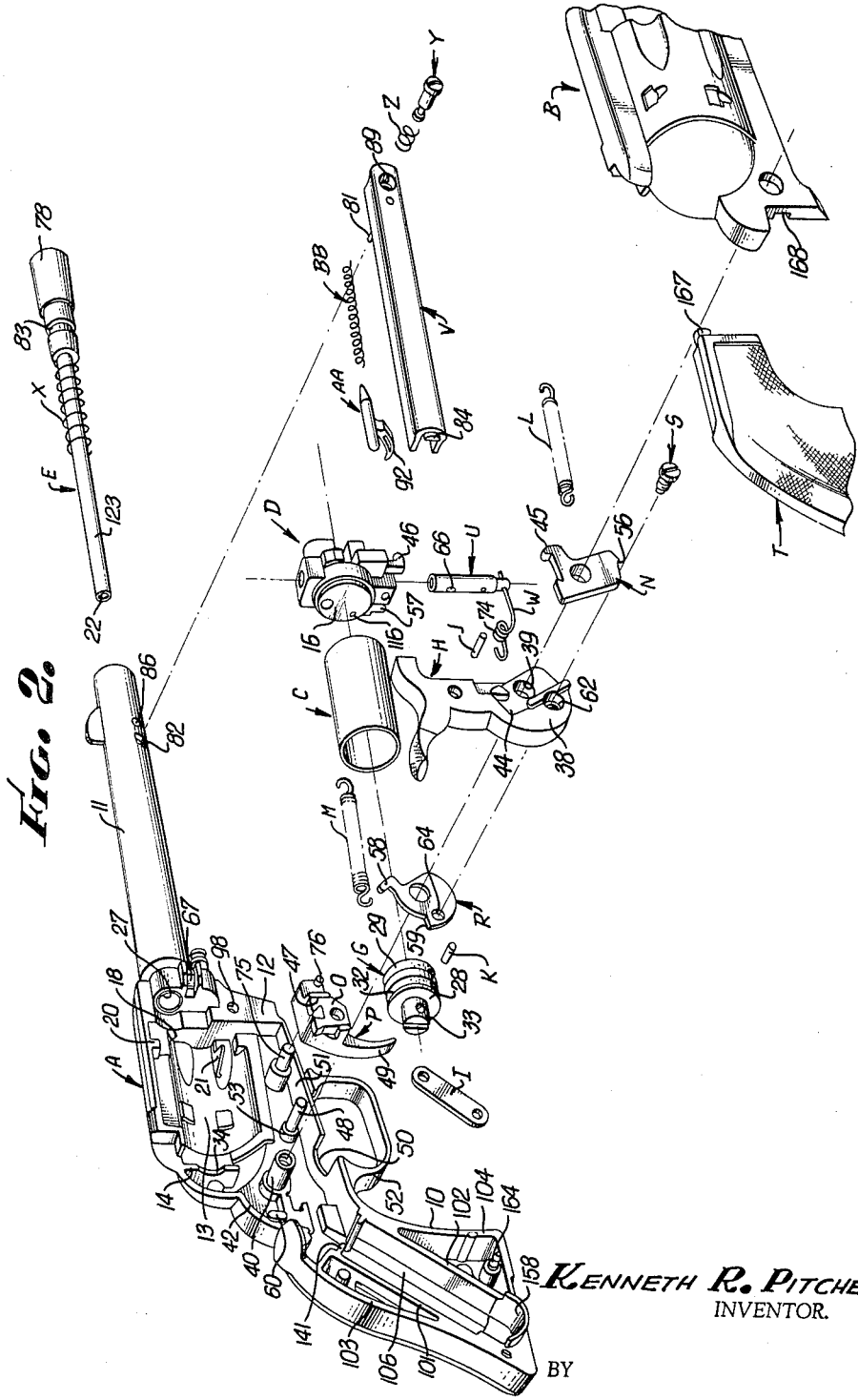
FIG. 2 is an exploded pictorial view illustrating the several parts comprising the pistol.

FIGS. 9, 10 and 11 are sectional views, taken along planes corresponding, respectively to lines 9—9, 10—10 and 11—11 of FIG. 8;

FIG. 12 (sheet VI) is a fragmentary sectional view, taken along a plane corresponding to line 12—12 of FIG. 10;

FIG. 13 is an elevation of the pistol, the external appearance of which is almost identical to the pistol described in FIGS. 1 to 12, but illustrating a modified form in which a gas cartridge is used for providing the motivating power;

FIG. 14 is an enlarged side elevational view generally similar to FIG. 1 but illustrating the modified pistol, the cover and one of the grips being removed;

FIG. 15 is a fragmentary pictorial view illustrating the inside construction of the grip together with the pin attached to the gun frame;

FIG. 16 is a fragmentary enlarged sectional view taken along a plane corresponding to line 16—16 of FIG. 14;

FIG. 17 is an enlarged view illustrating the firing head and valve structure in axial section, portions of the surrounding structure being illustrated in elevation;

FIG.18 is a pictorial view illustrating the two parts of the valve structure;

FIG. 19 is an enlarged fragmentary sectional view illustrating the manner in which the gas cartridge is punctured;

FIG. 20 is a pictorial view illustrating the hammer;

FIG. 21 is a sectional view similar to FIG. 17 but illustrating the valve in open position as a result of impact by the hammer structure;

FIGS. 22 and 23 are sectional views, taken along planes corresponding, respectively, to lines 22—22 and 23—23 of FIG. 21; and FIG. 24 (sheet IV) is a sectional view, taken along a plane corresponding to line 24—24 of FIG. 14.

A spring powered pistol is illustrated in FIGS. 1 to 12. As shown in FIG. 2, the pistol includes a frame A made of cast metal and having a handle 10, a barrel 11 and central walls 12 forming a cavity 13 in which operative parts of the pistol are contained. The central cavity 13 is closed by a cover B also made of cast metal.

In external appearance the central walls 12 of the frame A and the cover B simulate a revolving cylinder. In the space thereby enclosed, is an air cylinder C, as shown in FIG. 1. The cylinder C is formed uniform, and may be made from tubular stock material. From the cylinder C, air is forced into a firing head D which releasably holds a missile at the rear of the barrel.

The lefthand end of the cylinder is retained by a transverse internal lug 14 (FIGS. 1, 2 and 4) formed on the frame A, and a corresponding companion lug 15 (FIG. 4) formed on the cover B. The righthand end of the cylinder C fits about a circular land 16 at the rear end of the firing head D and is sealed thereto, as by epoxy cement.

The firing head B extends upwardly, downwardly and laterally of the circular land area 16.

The firing head D is confined against a plane surface 18 (see FIGS. 1, 2 and 4) at the forward end of the cavity 13. This surface which extends perpendicular to the axis of the barrel 11, is defined by contiguous portions of the frame A and cover B. The firing head D has a frontal surface 19 that engages the frame-cover surface 18. An internal lug 20 (FIGS. 1 and 2) at the upper end of the frame cavity, and a companion part on the cover B (not shown) engage behind the upper end of the firing head D to retain it in position. An internal lug 21 located just beneath the land 16 engages behind the lower end of the firing head D for the same purpose. The cover B has a lug corresponding to lug 21.

The firing head D has a through passage 22 in which a missile F is held preparatory to firing. One end of the passage 22 opens in the circular land 16 and is thus in communication with the cylinder C. The other end of the passage 22 registers with a barrel insert E that is detachably held in the frame barrel 11 in a manner to be hereinafter described.

The barrel insert has a tubular part 23 that fits the end of the passage 22. An interiorly stepped bushing 24 lining the end of the passage 22 provides a shoulder engaged by the end of the part 23.

The firing head D has a frontal projection 25 extending about the bushing 24 and entering a recess 26 in the forward cavity wall 18 that surrounds the inner end of the bore 27 of the frame barrel 11. This ensures alignment of the head passage 22 with the bore 27 of the frame barrel 11 so that the tubular part 23 of the barrel insert E passes easily into the bushing 24 without encountering any discontinuity.

In order to pressurize the cylinder C appropriately to propel the missile, a piston structure G is provided. The piston G has a body 28 which at its inner or forward end mounts a piston ring 29 of resilient flexible material, such as rubber. The ring 29 is formed generally as a cup with a peripheral flange extending forwardly. A retainer 30 placed over the central portion of the piston ring 29 clamps the ring 29 to the piston body 28. A screw 31 is provided for this purpose.

The outer end of the piston body 28 carries an oil wick 32 to provide suitable lubrication for the interior surface of the cylinder B.

Due to the forward disposition of the flange of the sealing ring 29, friction urges the ring outwardly and to seal the cylinder when the piston G moves forwardly. Friction urges the ring inwardly when the piston moves rearwardly. This check-valve type arrangement permits easy retraction of the piston G to charge it with air; yet the cylinder is sealed on the work stroke of the piston.

For connection to a suitable actuator structure, the piston body 28 has a rearward projection 33 capable of projecting through opposed arcuate recesses 34 and 35 (see also FIG. 2) in the companion lugs 14 and 15 of the frame A and cover B.

The actuating structure in the present example appears to be a conventional hammer H. The hammer H and the piston G are connected by a rod I. One end of the rod I is received within a shallow central recess 36 of the trigger (FIG. 5) and a connection is established by a pin J. The rearward projection 33 of the piston is slotted as at 37 (FIGS. 2 and 4) to receive the other end of the connecting rod I. A pin K achieves the requisite connection.

The hammer H has a central pivot plate 38 having an aperture 39 by the aid of which the hammer H is journalled on a hardened hollow steel bushing 40 (FIGS. 2 and 3). The bushing 40 is force-fitted in an embossment 41 of the pistol frame A. The hammer H extends radially outwardly of the bushing 40 and through a clearance space provided by opposed edges 42 and 43 of the frame A and cover B located behind the cylinder C and above the handle 10. The hammer H may be moved from the position of FIG. 5 in which the piston G is retracted to the position of FIG. 1 in which the piston G has advanced. During this movement, the connecting link I moves between the opposed surfaces 42 and 43 of the frame A and cover B, and between the arcuate lug recesses 34 and 35. Engagement of the hammer H with lugs 14 and 15 determines the forward limit.

In order to provide energy for quickly moving the hammer H so that propelling pressure is developed in the cylinder C, two coil springs L and M are provided, located respectively beneath and along opposite sides of the cylinder C. The coil spring L is at all times connected to the hammer H, whereas the spring M is selectively coupled to the hammer H in a manner to be hereinafter described, whereby the power of the air pistol can be selected.

A sear N has a non-circular peripheral contour to fit a corresponding recess 44 in the outer surface of the bearing plate 38 of the hammer H for movement therewith. The sear N has a projection 45 for anchoring one end of the spring L. This projection 45 is suitably located in spaced relationship to the axis of the hammer H. The other end of the spring is connected to a projection 46 formed on the outer side of the firing head D. Due to the location of the projection 45, energy is stored in the spring L when the hammer H is moved rearwardly to retract the piston G.

For releasably holding the hammer H in the position of FIG. 1 and corresponding to storing of energy in the spring L, a pawl O is provided. The pawl O, like the sear N, is made of flat hardened steel stock, and has a non-circular peripheral contour to fit a corresponding recess 47 in the outer face of a trigger P. The trigger P and the pawl O are pivotally mounted on a steel pin 48 projecting outwardly from the bottom of the frame cavity 12 and suitably press fitted thereto.

The trigger P has a finger piece 49 that extends downwardly through a slot 50 in a wall 51 forming the lower boundary of the frame cavity 12. The finger piece 49 is surrounded by a suitable trigger guard 52, integrally formed on the frame A. A coil spring Q is seated about a boss 53 from which the bearing pin 48 extends. One end of the spring Q engages the lower wall 51 and the other end engages the trigger P to urge it in a counterclockwise direction about its pin 48. To actuate the trigger, the finger piece 49 must be moved rearwardly to rotate the trigger in a clockwise direction against the force of the spring Q until the position of FIG. 5 has been reached.

The pawl O has an operative projection 54 cooperable with the sear N. When the finger piece 49 is released, this projection 54 is caused by the spring Q to a forward cam surface 55 of the sear N (FIG. 5).

As the hammer is retracted against the force of spring L, the cam surface 55 rocks the pawl O in a clockwise direction against the force of coil spring Q until the pawl projection 54 passes a latching surface 56 of the sear N. This corresponds to full retraction of the hammer. When the hammer is released, the pawl O by engagement with surface 56 holds the hammer against advancement. When the trigger P is manually moved in a clockwise direction, the pawl O clears the sear N, and the hammer rapidly moves forwardly to the position of FIG. 5, propelling the missile.

The second power spring M has one end attached to a projection 57 on the inner side of the firing head D (FIG. 7). Its other end is attached to a projection 58 formed on a pivot plate R. This pivot plate R is carried by the hollow bushing 40 and is confined between the bearing plate 38 and the frame boss 41, as shown in FIG. 3. The pivot plate R has a shoulder 59 that is located beneath a small lug 60 (FIG. 2) formed on the frame A. The shoulder 59 engages this lug 60 under the action of the coil spring M to determine a limited position thereof.

The pivot plate R may selectively be coupled to the hammer H by the aid of a coupling screw S (FIGS. 3 and 6). This screw has a central threaded portion 61 by the aid of which it is carried on the hammer H. Thus, the screw engages an aperture 62 in the hammer bearing plate 38, located in spaced relationship to the hammer axis. The screw has a reduced unthreaded projection 63 at its end capable of entering an aperture 64 in the pivot plate R when the screw is advanced inwardly of the bearing plate aperture 62 (FIG. 6). In this position, retraction of the hammer results in corresponding retraction of the pivot plate R and against the force of the supplemental spring M. Accordingly, power of the air pistol is increased. The screw S has a slotted head 65 recessed into the side of the bearing plate whereby the screw can be advanced or retracted to couple or uncouple the pivot plate R.

The coupling screw S is aligned with the aperture 64 of the pivot plate R when the hammer H is in the inactive position of FIG. 5. Access to the coupling screw S at the lower corner of the cavity 12 and at the upper end of the handle 10, is provided by removal of the grip T which is detachably carried on one side of the frame handle 10.

The manner in which the grip T is detachably carried will be described in connection with the second form of the present invention.

The firing head D carries a slider U (FIG. 8) that serves to transfer or elevate missiles one by one from a magazine V to the firing head passage 22. The magazine V extends along the exterior of the frame barrel 11 and will be described more fully hereinafter.

The slider U is reciprocable between limits in a vertical aperture 65 that intersects the firing head passage 22 at right angles. The slider has an end projecting beneath the head D and into the frame cavity 12. The slider U has a through stepped aperture 66 that in effect forms, in one position of the slider, a part of the firing head passage 22. In another position (FIG. 8) the aperture 66 registers with the magazine V and receives a missile therein. The recesses and passages establishing communication between the magazine and the slider aperture 66 will be presently described.

The magazine V is formed as a channel, with the channel opening closed by the exterior surface of the frame barrel 11. The inner end of the magazine is open, and registers with a channel 67 (FIG. 8) formed between two lugs 68 and 68' (FIG. 8) of the frame A. This channel 67 inclines inwardly toward the plane that includes the axis of the slider aperture 65 and the axis of the barrel 11 or insert E. The inwardly inclined channel 67 in turn registers with an inwardly inclined channel 67' (FIGS. 8 and 9) formed in the firing head B. The channel 67' intersects the slider aperture 65 beneath the firing passage 22.

The cover B, as shown in FIG. 9, has a projection 69 that serves to close the channels 67 and 67' adequately to guide the missiles to the slider U.

When the slider U is moved downwardly, its aperture 66 registers with the channel 67 and receives a missile F. A high density cylindrical permanent magnet 70 (FIG. 8) force fitted in the upper end of the slider has a pole exposed at the slider recess 66, and serves to attract the missile therein.

When the slider U is moved upwardly, a missile is elevated to the firing head passage 22. The magnet 70 releasably holds the missile preparatory to firing, the shoulder 71 forming a seat towards which the missile is attracted.

A traverse pin 72 (FIG. 8) affixed to the slider U reciprocates in the slot 73 formed in the firing head D accurately to determine opposite limits to the movement of the slider U.

The slider U is operated automatically upon retraction of the hammer H and as shown most clearly in FIG. 1. For this purpose, a yielding connection is established between the trigger P and the slider U by a spring W. The spring W has a central coiled portion 74 journalled upon an integrally cast pin 75 of the frame A. The pin 75 is located just forwardly of the trigger P. One end of the spring W is returned about a laterally projecting pin 76 formed on an adjacent portion of the trigger P. The other end of the leaf spring passes through an aperture 77 in the lower projecting end of the slider U.

In the phantom-line position of FIG. 5 corresponding to the inactive position of the trigger and to the parts, the spring W is urged by pin 76 in a clockwise direction, carrying the slider U downwardly for registry of its aperture 66 with the magazine channels 67 and 68. As the trigger is moved to the position of FIG. 1, the spring W is moved in a counterclockwise direction, carrying the slider U upwardly so that the slider aperture 66 registers with the firing passage 22. The parts are so proportioned that the slider U reaches its respective limits of movement before the trigger reaches the corresponding limits of movement just described. The spring W allows this overrunning movement. During such overrunning movement, the spring W stores energy and exerts a positive seating force of the slider U ensuring its registry with the magazine and firing passage respectively. Trigger release of sear N occurs after the slider has reached its upper limit of movement, and the missile is thus appropriately positioned at the moment of firing.

The barrel insert E (as shown in FIG. 12) includes in addition to the tubular part 23, a conical head 78 having a stepped bore 79 in which the outer end of the tubular part 23 is fitted. The shoulder 79' formed interiorly of the bore 79 is engaged by the end of the tubular part, and the outer end of bore 79 forms a uniform continuation of the interior of the tubular part 23 adequately to guide the outward course of the missile.

The frame barrel 11 has a configuration corresponding to that of the barrel insert E for its reception. An ejector spring X is interposed between an intermediate, outwardly facing shoulder 80 of the frame barrel bore 27 and the inner end of the conical head 78. The barrel insert E compresses the ejector spring X as it is placed in position. A latching pin attached to the magazine V serves as a means for releasably holding the barrel insert E in position and against the force of the ejector spring X. The latching pin 81 extends through a clearance slot 82 in the frame barrel 11 for engagement with an annular groove 83 in the conical head 77.

The magazine V is mounted for limited tilting movement about its lefthand or inner end to allow the latching pin 81 to be retracted for ejection of the barrel insert E. For this purpose, the lefthand end of the magazine V has a small projection 84 (see FIGS. 2 and 5). The cover has a suitable notch or aperture for receiving this projection 84. The opposite or outer end of the magazine V is attached to the frame barrel 11 by the aid of a screw Y, as shown in FIG. 12. The screw has a reduced threaded end 85 engaging a threaded recess 86 of the frame barrel 11, the shoulder 87 formed by the reduced end 85 engaging the barrel 11. The screw Y including its head 88 is received in an aperture 89 formed in the magazine, and located beyond the pin 81. A coil spring Z engages the head 88 and an outwardly facing shoulder or step 91 formed in the aperture 89 to urge the magazine V against the barrel 11.

The parts are so designed that the magazine V has a permitted movement away from the frame barrel 11, the limit being determined by the space between the turns of the coil spring Z. The slight movement does not permit the missiles F to escape from the magazine, but does permit the barrel insert to be released.

When the barrel insert E is moved into the frame barrel 11, the outer conical surface of the head 77 serves automatically to cam the pin, and the magazine V outwardly until the pin snaps in the groove 83 suitably. The removable feature allows the placement of a dart in the end of the tubular part 23 and as shown in phantom lines in FIG. 12. When so placed at the inner end of the barrel, rather than at the outer end, the space in which the propelling pressure is generated is yet confined; hence the power is as expeditiously applied to a dart as to the round metal missiles F.

The missiles F are urged outwardly of the magazine V and toward the firing head D by the aid of a push rod AA slidable in the channel formed in the magazine V. A light compression spring BB behind the push rod AA provides the force for missile advancement. The push rod AA has a finger piece 92 extending along the under surface of the frame barrel 11 to serve as a means for its retraction against the force of the advancing spring BB. When the push rod AA is retracted to its rear limit in the magazine V, a slot 93 (FIG. 8) is exposed for insertion of missiles.

The cover B is held in place by two screws 94 (FIGS. 3 and 6) and 95 (FIG. 8). The screw 94 engages the threaded interior of the hollow hammer mounting bushing 40, a boss 96 of the cover B holding the hammer bearing plate 38 and pivot plate R in place. The screw 95 engages a recess 98 of the frame A (FIG. 2) located just forwardly of the wall surface 18 at the base of the barrel 11.

In the form illustrated in FIGS. 13 to 24, the firing head D is provided as before along with the magazine V, barrel insert E (FIG. 17), slider U, leaf spring W, trigger P, a pawl O and spring Q.

In order to provide power for propelling a missile through the firing head passage 22, a gas cartridge CC is provided. This cartridge is located in the handle portion 10 of the gun frame A and between generally parallel wall portions 101 and 102 (FIG. 14). The wall portions 101 and 102 extend generally from the butt end of the handle 10 toward the central portion of the frame between outer and inner walls 103 and 104 of the handle. The walls 101 and 102 on one side of the pistol are spaced apart to allow the cartridge to drop therebetween on removal of grip T. The walls 101 and 102 have converging portions 105 and 106 to form a seat along which the cartridge CC extends.

A puncturing unit DD cooperates with the neck of the cartridge CC which is upwardly oriented, and in a manner presently to be described. Gas from the cartridge CC is communicated to a valve control unit EE via a flexible conduit FF.

The valve unit EE has physically the same external dimension as the cylinder C of the spring pistol of FIGS. 1 to 12. It correspondingly fits in place between the gun frame A and the cover B.

As shown in FIGS. 18 and 19, the valve control unit EE is made of two main body parts 107 and 108. One of the parts 107 at one end fits about the circular land 16 of the firing head D, and provides a chamber 109 which is supplied by the conduit FF. The chamber 109 is formed by an accentrically located stepped recess 110 extending inwardly from the lefthand or rearward end surface 111 of the part 107. The conduit FF fits within a transverse stepped aperture 112 that intersects the side of the chamber 109.

The valve part 107 has a through passage 113 paralleling the axis of the chamber forming recess 110, but located above it and extending from one end surface 111 to the other, 114. This passage 113 is in registry with the firing head passage 22. To ensure suitable alignment of the passages 113 and 22, the valve body part 107 carries a projection 115 that enters a recess 116 (see also FIG. 2) formed in the circular land 16 of the firing head D.

The outer end of the chamber forming recess 110 is closed by a valve seat insert GG. This valve seat insert has a flange 117 opposed to the outwardly facing shoulder 118 of the recess. A sealing ring HH establishes a suitable seal between these parts.

The insert GG has a through opening 119 that terminates inwardly in a raised annular seat 120. This seat is normally closed by a closure structure II.

The closure structure II has a head 121 located in the chamber 109. A central stem 122 projects outwardly and with substantial clearance through the valve seat insert opening 119. The head 121 carries a conformable sealing disc 123 that opposes the valve seat 120. The valve head is normally urged to closed position by a helical compression spring JJ guided on a reduced end 124 of the closure and engaging the bottom of the recess 110. When the valve closure II is moved to the right, the valve is opened and a charge of gas is released.

The other valve body part 108 receives this charge of gas and communicates it to the passage 113. Thus, the valve body part 108 has a reduced end 125 fitting within a peripheral flange 126 of the valve body part 107. The inner end surface 127 of the valve body part has a transverse slot 128 that registers at opposite ends with the aperture 119 of the valve seat insert GG and the passage 113 respectively. A semi-circular projection 129 surrounds the inner end of the slot 128 and is received within an enlargement 130 at the end of the valve seat insert opening 119.

The end surface 125 of body part 108 engages the end surface 111 of body part 107, and the valve seat insert GG is appropriately confined. Epoxy cement may secure the parts together.

In order to ensure alignment of the valve body parts for appropriate registry of the slot 128 with the passage 113, the valve body part 108 has a projection 131 in its end face 125 that engages a recess 132 in the corresponding opposing end surface 111 of the valve body part 107.

The stem of the closure II is guided by an aperture 133 in the valve body part 108, and its end projects beyond a boss 134 formed in the lefthand end surface thereof. This boss fits the opposed arcuate recesses 34 and 35 of the frame lugs 14 and 15. A hammer structure H' impacts against the end of the stem in order momentarily to unseat the closure to allow a charge of gas to pass to the firing passages. The hammer H' for this purpose carries a firing pin KK (FIG. 21) to be described more fully hereinafter.

The hammer H' is similar to the hammer H of the previous form. It has a bearing plate 135 (FIG. 20) mounted on the hollow bushing 40 of the frame A'. A spacer plate 136 having an aperture 137 fitting the frame lug 60 provides a surface against which the inner side of the bearing plate 135 bears. The plate 136 substitutes for the spring pivot plate R of the form illustrated in FIGS. 1 to 12.

The hammer H' carries the sear N on its outer surface (FIG. 14) which cooperates with the pawl O in the same manner as described in connection with the previous form.

A light coil spring L' cooperates with the sear N and the projection 46 of the firing head D, as did the spring L of the previous form.

The firing pin KK is so mounted on the hammer H' as to be engageable with the projecting end of the valve stem upon release of the sear N by actuation of the trigger finger piece 49. The extent of forward movement of the hammer H' is determined by engagement with the lugs 14 and 15. The extent of opening movement of the valve closure II at the limited position of the hammer H' then depends upon the amount that the firing pin KK (FIG. 21) projects forwardly of the hammer H'. For this purpose, the pin KK is in the form of a headless screw accommodated in a through transverse aperture 138 of the hammer H'. By turning the pin by the aid of a suitable slot 139 at its outer end (see also FIGS. 20 and 22), the travel of the closure II is adjusted and the power of the gun is accordingly controlled. If desired the pin KK can be retracted adequately to operate as a safety wherein the valve closure II is not engaged at all.

The puncturing unit DD, shown in detail in FIG. 19, has a body 140 fitting between lower and upper wall portions 141 and 142 of the frame just behind and below the hollow bushing 40 upon which the hammer H' is mounted. The lower wall portion 141 extends between the walls 101 and 102 at their upper ends, the neck of the cartridge CC projecting upwardly through an opening 142 in the wall portion. The body 140 has a stepped recess 143, the opening of which receives the neck of the cartridge CC. A sealing ring 144 seals the cartridge neck to the body 140 and is held against an intermediate shoulder 145 of the body by a retainer ring 146 fitting the outer end of the body recess 140. The retainer may be secured by epoxy cement or the like to the body 140. The end of the neck is spaced from the bottom wall 147 of the recess to form a chamber 148 cooperable with the conduit FF. Thus, the conduit is fastened at an opening 149 intersecting the bottom of the body recess.

The cartridge plug 150 is pierced by a pin 151 mounted for limited longitudinal movement in an aperture 152 extending through the bottom of the body recess. The pin 151 has a puncturing point 153 for piercing the cartridge plug 150 upon inward movement thereof. The puncturing pin 150 has a flange 154 that normally seals about the edges of the aperture 152 and under the influence of gas pressure in the chamber 148. A retainer 155 pressed against another intermediate shoulder 156 of the body recess confines the pin 151 on the body 140.

The upper end of the puncturing pin 151 is opposed to and in the path of retracting movement of a rearwardly extending surface 157 of the hammer H'. When the hammer H' is in the cocked position of FIG. 14, this surface 157 is spaced slightly from the end of the pin 151. However, upon slight retraction of the hammer H' beyond the position illustrated in FIG. 14, the rear surface 157 engages the puncturing pin 151 and punctures the cartridge CC. The pressure chamber in the valve control unit EE is accordingly charged. Manipulation of the hammer EE may take but a fraction of a second immediately in advance of operation of the trigger P. Thus, the pistol can be in a state of readiness without the cartridge CC having been previously punctured.

The conduit FF extends along the inside surface of the frame A to clear the hammer bearing plate 135. The conduit FF extends along the boss 41 as may be visualized in FIG. 3, and thence beneath the valve unit EE in the space otherwise occupied by the supplemental spring M. The puncturing unit DD, valve unit FF, firing head D and conduit FF together constitute a pre-assembled unit that drops in place in the frame. Of course, no seal is necessary between these parts and the frame since the frame forms no part of the gas path between the cartridge and the barrel.

In order releasably to hold the cartridge CC in position relative to the puncturing unit DD, a cam LL is provided that is located at the lower end of the space in which the cartridge CC is received. The cam is generally cylindrical in shape, and is guided for angular movement by a semi-circular recess 158 (FIG. 2) adjoining the bottom of the space between frame walls 101 and 102. The cam has a reduced extension (not shown) journalled at an aperture of the frame A at the bottom of semi-cylindrical recess 158. The outer end of the cam has a slot 159 by the aid of which it may be actuated. The cam has an intermediate cam surface 160 aligned with the cartridge CC. This surface is intersected by an arcuate slot 161. The bottom of the slot 161 lies close to the cam, and when the arcuate slot 161 faces the cartridge CC, substantial clearance is provided for longitudinal movement of the cartridge CC. The cartridge can be positioned so that it entirely clears the unit DD. Upon subsequent movement of the cam LL in a counterclockwise direction, the operative portion of the cam surface 160 falls at an increasing distance from the axis of the cam, and the cartridge CC is locked in place, as indicated in FIG. 14 and FIG. 19. The cam may be manipulated conveniently by any tool or coin cooperable with the slot 159.

The cartridge CC and the cam LL are accessible upon removal of the grip T. The grip T has an inwardly facing recess 162 (FIG. 16) at its lower end that receives a conical head 163 of an anchoring pin 164 attached to the frame A. Thus, the pin 164 is press fitted in an apertured boss 165. A resilient, slightly flexible wire 166 (FIG. 15) having ends anchored by the grip extends across the recess 162 so that it must be flexed to allow entrance of the head 163. The conical head 163 cams the wire aside, enters the recess 162 while the wire 166 snaps behind the head 163 to accomplish a spring lock.

The grip T at its upper end has an integral projection 167 (FIG. 13) received in a notch 168 (FIG. 2) in the cover B before the grip is snapped over the head 163 of the pin 164. The other grip MM has a similar projection engaging a notch in the frame A. An integral pin 169 (FIG. 16) enters an aperture 170 of the frame, and is worked over in order fixedly to secure the grip MM. A thumb nail slot 171 (FIG. 14) facilitates removal of the grip T.

The inventor claims:

1. In a small arms weapon: a frame having a barrel; an insert for lining the barrel, and including a tubular part extending throughout the length of the barrel; an ejector spring interposed between the barrel and the insert and urging the insert outwardly of the barrel; releasable latch means carried by the frame and positioned to engage the insert for locking the insert in the barrel against the force of said ejector spring; and yielding spring means normally urging said latch means to engaging position; said insert being freely removable from the barrel upon release of said latch means.

2. In a small arms weapon: a frame having a cavity and a barrel extending from the cavity; means forming a cylindrical firing passage at the inner end of the barrel and in which a spherical missile may be held preparatory to firing; a removable barrel insert accommodated in the barrel and having a tubular part provided with an inner end fitting the end of said firing passage, said tubular part having an internal cylindrical passage forming a uniform continuation of said firing passage; an ejector spring interposed between the barrel and the insert and urging the insert outwardly of the barrel; latch means for releasably locking the insert in place; yielding spring means normally urging said latch means to engaging position; said barrel insert being freely removable from the barrel upon release of said latch means for placement of a dart at the said inner end of said insert; and slider means for elevating a spherical missile into said firing passage at a place spaced inwardly of the juncture between the firing passage and said insert.

3. In a small arms weapon: a frame having a barrel; an insert having a tubular part extending substantially throughout the length of the barrel; an ejector spring interposed between the barrel and the insert; an elongated member providing a magazine channel and extending along the exterior of the frame; means mounting the magazine member for limited movement away from the barrel; spring means urging the magazine member toward the barrel; a latching projection carried by the magazine and engageable with said insert for holding the insert in the barrel against the force of said ejector spring.

4. In a small arms weapon: a frame having a barrel; an insert having a tubular part extending substantially throughout the length of the barrel; said insert also having a head receiving one end of the tubular part and providing a uniform continuation of the interior surface of the tubular part; said head providing an inwardly facing shoulder and an outwardly diverging external surface configuration; said barrel having an interior configuration substantially conforming to the insert and providing an outwardly facing shoulder opposed to said shoulder of said head; an ejector spring surrounding the insert and engaging the said shoulders at opposite ends; said head having an annular groove located at said diverging external surface; a magazine extending along the barrel and supported by the frame for limited movement laterally of the barrel; a latching pin mounted on the magazine for movement transverse to the barrel and projecting into the barrel; spring means urging the magazine toward the barrel and the latching pin inwardly of the barrel to be engaged by said diverging external surface of said head; said spring means yielding to permit outward movement of said magazine and pin upon inward movement of said head; said head groove being in alignment with said pin when the head and tubular part are substantially fully inserted in the barrel whereby said spring urges the pin to seat in said groove; said magazine being manually accessible for retracting the pin.

5. The combination as set forth in claim 4 in which a screw projects laterally of said frame barrel, and is recesed within an aperture of said magazine, said spring surrounds the screw and is interposed between the head of said screw and an outwardly facing shoulder formed in the magazine aperture, the spring having turns the clearance of which determines the limit to outward movement of the magazine.

References Cited by the Examiner
UNITED STATES PATENTS

| | | | |
|---|---|---|---|
| 655,170 | 7/1900 | Markham | 124—30 |
| 903,092 | 11/1908 | Hough | 124—30 |
| 904,507 | 11/1908 | Burrows | 124—30 |
| 1,358,959 | 11/1920 | Le Fever | 124—30 |
| 1,677,810 | 7/1928 | Bond | 124—51 |
| 2,383,439 | 8/1945 | Baer. | |
| 2,499,340 | 2/1950 | Wells | 124—51 |
| 2,564,915 | 8/1951 | Nelson. | |
| 2,898,693 | 8/1959 | Ruger | 42—77 |
| 3,048,159 | 8/1962 | Kline et al. | 124—51 |

RICHARD C. PINKHAM, *Primary Examiner.*
LOUIS R. PRINCE, *Examiner.*